Aug. 26, 1930.   C. H. KIRBY   1,774,277
PISTON
Filed Feb. 23, 1929   2 Sheets-Sheet 2

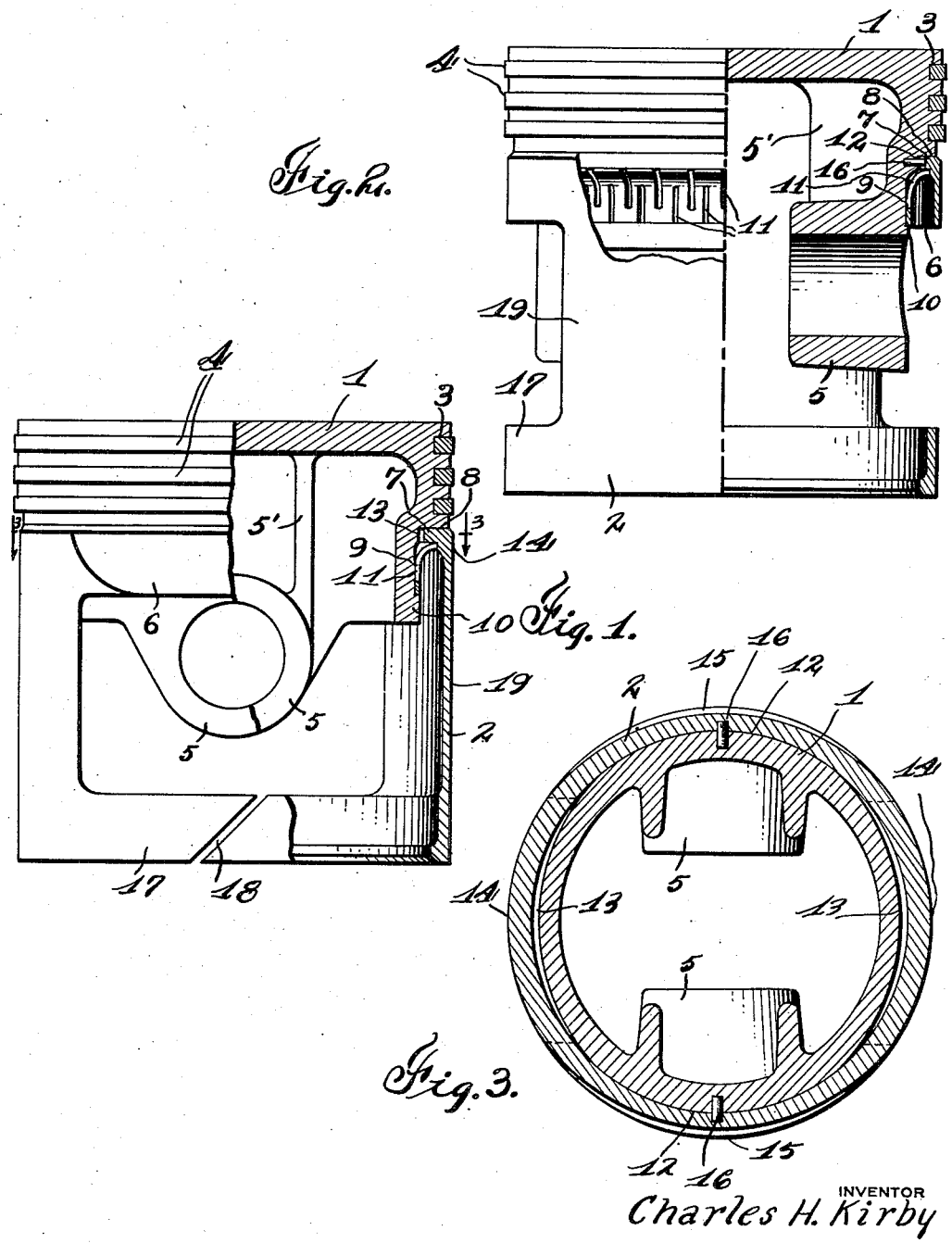

INVENTOR
Charles H. Kirby
BY
ATTORNEYS

Patented Aug. 26, 1930

1,774,277

UNITED STATES PATENT OFFICE

CHARLES H. KIRBY, OF FLINT, MICHIGAN

PISTON

Application filed February 23, 1929. Serial No. 342,119.

The invention relates to pistons and refers more particularly to composite pistons. One of the objects of the invention is to so construct the head and skirt members of a composite piston that they provide for differential expansion of these members and also provide for proper fit of the skirt member in the cylinder and more particularly substantially constant clearance between the working surfaces of the skirt member and the cylinder wall. With these as well as other objects in view, the invention resides in the novel features of construction and combinations and arrangements of parts as more fully hereinafter set forth.

In the drawings:—

Figures 1 and 2 are sectional elevations at right angles to each other of a piston embodying my invention;

Figure 3 is a cross section on the line 3—3 of Figure 1;

Figure 4:
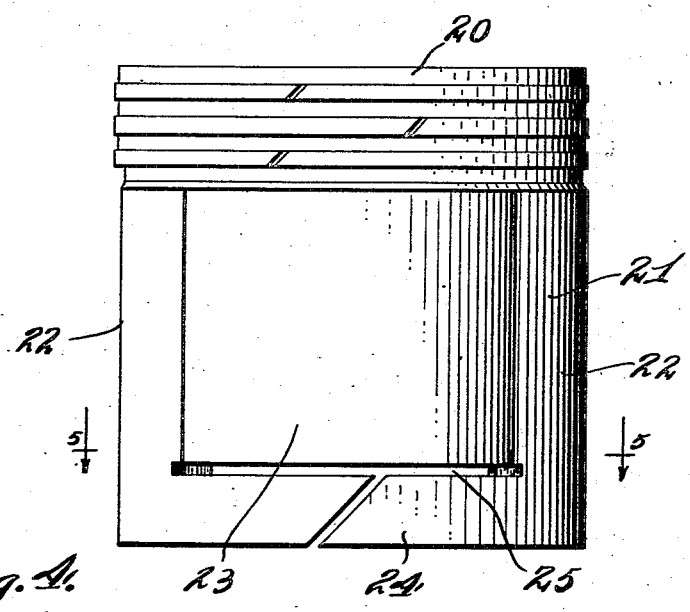
Figure 4 is a sectional elevation of a modified piston.

The piston comprises the head 1 and the skirt 2, the former of which is preferably formed of aluminum or aluminum alloy and the latter of which is preferably formed of iron. The head is provided with the annular grooves 3 for receiving the piston ring 4 and the pair of diametrically opposite hubs 5 for receiving the wrist pin, which connects the connecting rod to the piston. The head is also preferably provided with the integral reinforcing ribs 5' extending longitudinally from its outer end to the hubs.

The skirt has at its outer end the ring 6 which is formed with the inwardly extending band of annular flange 7. The upper face of this band is secured against the annular shoulder 8 upon the head by suitable means such as the resilient ring 9, which engages the lower face of the band 7 and the annular shoulder 10 upon the head. As shown, the ring is formed with the transversely extending angularly spaced slots 11 extending from its upper and lower edges and overlapping each other to provide the required resiliency of the ring and at the same time provide for expanding the ring sufficiently for assembly with the head and skirt.

The head has a band encircled by the band 7 of the skirt having its outer face formed with the diametrically opposite concentric portions 12 of the same radius of curvature and concentric with the axis of the head, and the eccentric portions 13 intermediate and of a greater radius of curvature than the concentric portions 12. The concentric portions 12 are in substantial alignment longitudinally of the head with the hubs 5. The skirt band 7 has an inner circular face concentric with the axis of the head and of a radius of curvature to fit the concentric portions 12 of the head band. The skirt band has its outer face formed with the concentric portions 14 of the same radius of curvature and concentric with the axis of the head and forming working surfaces for slidably engaging the cylinder wall, and the eccentric portions 15 intermediate and of a greater radius of curvature than the concentric portions 14. The concentric portions 14 are substantially opposite the eccentric portions 13 and the eccentric portions 15 are substantially opposite the concentric portions 12, the eccentric portions 15, however, preferably overlapping the eccentric portions 13.

The outer face of the ring 6 has portions corresponding to and registering with the concentric and eccentric portions 14 and 15, respectively.

With this arrangement and when the piston is unheated, the eccentric portions of the head band provide clearance within the skirt band for differential expansion of the head and skirt and the eccentric portions of the skirt band provide clearance within the cylinder for differential expansion of the skirt and the cylinder wall. When the piston is heated as by reason of its operation in the cylinder expansion of the head relative to the skirt moves the eccentric portions of the skirt band outwardly, thereby tending to move the concentric portions of the skirt band inwardly. This inward movement compensates for the expansion of these concentric portions so that as a result the clearance between these concentric portions of the skirt band and the cylinder wall remains substantially constant. The expansion of the head relative to the skirt also moves the eccentric portions of the head outwardly. As a result heating and consequent expansion of the piston causes the outer faces of both the head and skirt to become substantially circular, which condition occurs approximately when the piston reaches its maximum operative temperature, the full differential expansion of the head and skirt having taken place.

For holding the skirt from rotating relative to the head, I have provided the transverse pins 16 which extend radially of and engage the normally contacting portions of the head and skirt bands.

As shown in the present instance, the skirt 2 has at its lower end the annular ring 17 having the same radius of curvature as the concentric portions 14 of the outer face of the skirt band 7. This annular band may be diagonally severed at one or more points, as at 18, providing for resiliency. Intermediate the rings 6 and 17 are the diametrically opposite arcuate portions 19 integral therewith and preferably having the same radius of curvature as the concentric portions 14.

Figure 5:
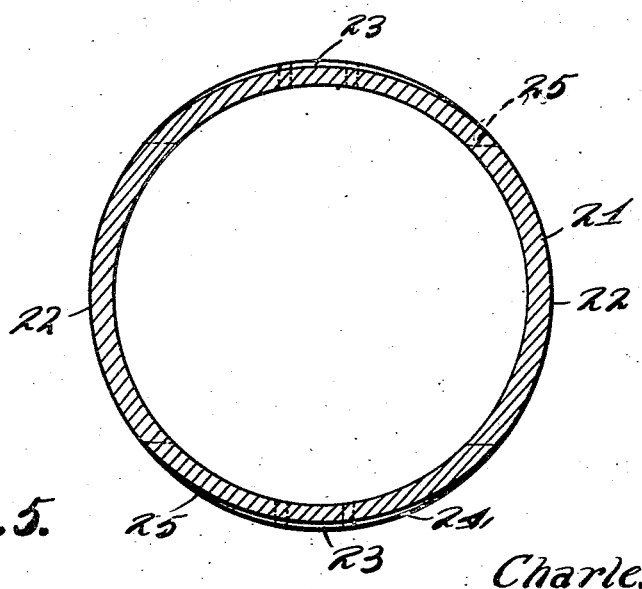
Figure 5 is a cross section on the line 5—5 of Figure 4.

As shown in Figures 4 and 5, the construction of the head 20 and skirt 21 are in general the same as the construction of the head and skirt of Figures 1, 2 and 3, the band structure being exactly the same. The skirt 21 differs, however, in that it is provided between its diametrically opposite arcuate portions 22 corresponding to the arcuate portions 19 of the skirt 2 with the eccentric portions 23 of a greater radius of curvature than the portions 22 and registering with the eccentric portions upon the outer face of the skirt band. These eccentric portions 23 are separated from the annular resilient ring 24 at the lower end of the skirt by the transverse slots 25, which preferably extend into the arcuate portions 22 to provide for increased resiliency. The ring 24 is preferably the same as the ring 17.

What I claim as my invention is:

1. In a piston, the combination of a head member and a skirt member encircling and connected to said head member, the encircling part of said skirt member and adjacent part of said head member having adjacent peripheral faces with portions in contact and other portions spaced from each other.

2. In a piston, the combination of a head member and a skirt member connected to said head member, said members having telescoping parts provided with outer faces having eccentric portions, the eccentric portions of said head member being intermediate the eccentric portions of said skirt member.

3. In a piston, the combination of a head member having a band provided with an outer face having diametrically opposite portions of the same radius of curvature concentric with the axis of the piston, and a skirt member connected to said head member and having a band encircling said first mentioned band and engaging said diametrically opposite portions, said second mentioned band being provided with an outer face having portions opposite said diametrically opposite portions of a greater radius of curvature than the intermediate portions of the outer face.

4. In a piston, the combination of a head member having a band provided with an outer face having diametrically opposite portions concentric with the axis of the piston and intermediate eccentric portions, and a skirt member connected to said head member and having a band encircling said first mentioned band and provided with an inner face concentric with the axis of the piston and engaging said diametrically opposite portions, said second mentioned band being provided with an outer face having eccentric portions opposite said diametrically opposite portions.

5. In a piston, the combination of a head member having diametrically opposite hubs for receiving a wrist pin and a band provided with an outer face having diametrically opposite portions in alignment with said hubs longitudinally of the piston concentric with the axis of the piston and intermediate eccentric portions, and a skirt member connected to said head member and having a band encircling said first mentioned band and engaging said diametrically opposite portions, said second mentioned band being provided with an outer face having portions opposite said eccentric portions concentric with the axis of the piston and eccentric portions opposite said diametrically opposite portions.

6. In a piston, the combination of a head member having a band provided with an outer face having diametrically opposite portions concentric with the axis of the piston and intermediate eccentric portions, and a skirt member resiliently connected to said head member and having a band encircling said first mentioned band and engaging said diametrically opposite portions, said second mentioned band being provided with an outer face having portions opposite said eccentric portions concentric with the axis of the piston and eccentric portions opposite said diametrically opposite portions and said skirt member having at its lower end a resilient annular ring concentric with the axis of the piston and of the same radius of curvature as said first mentioned portions of the skirt member.

7. In a piston, the combination of a head member having a band provided with an outer face having diametrically opposite portions concentric with the axis of the piston and intermediate eccentric portions, and a skirt member connected to said head member and having a band encirlcling said first memtioned band and engaging said diametrically opposite portions, said second mentioned band being provided with an outer face having portions opposite said eccentric portions concentric with the axis of the piston and eccentric portions opposite said diametrically opposite portions, said skirt member having diametrically opposite arcuate portions registering with the concentric portions of the outer face of said second mentioned band and intermediate eccentric portions, said skirt member also having at its lower end a resilient annular ring concentric with the axis of the piston and of the same radius of curvature as said arcuate portions and separated from said intermediate eccentric portions.

8. In a piston, the combination of a head member and a skirt member connected to said head member, said members having telescoping parts provided with outer faces having diametrically opposite eccentric portions, the eccentric portions of said head member being intermediate the eccentric portions of said skirt member.

9. In a piston, the combination of a head member and a skirt member encircling and connected to said head member, the encircling part of said skirt member and adjacent part of said head member having adjacent faces with diametrically opposite portions in contact and other diametrically opposite portions spaced from each other.

In testimony whereof I affix my signature.

CHARLES H. KIRBY.